3,225,018
HEAT CURING OF ETHYLENE/VINYLSILANE COPOLYMERS

Nathan L. Zutty, Charleston, W. Va., assignor to Union Carbide Corporation, a corporation of New York
No Drawing. Filed Dec. 15, 1961, Ser. No. 159,754
3 Claims. (Cl. 260—88.1)

This invention relates to novel copolymers containing ethylene. More particularly, this invention relates to heat-cured copolymers of ethylene and certain vinylsilanes and to processes for curing them.

Recently it was discovered that ethylene can be copolymerized with certain vinyltrialkoxysilanes at elevated temperatures and pressures in the presence of a free-radical catalyst to produce a solid, high molecular weight, substantially linear copolymer. It has now been discovered that these copolymers cross-link solely by the application of heat to form a composition having a lower solubility, a higher softening point, and a greater resistance to deformation than does the initial copolymer. Thus, it is now possible to fabricate articles from these ethylene-containing polymers by conventional processes, such as extrusion molding, injection molding, injection-extrusion molding, calendaring, blow molding, compression molding, casting, and the like, and subject the resulting article to a post-fabrication heat cure, whereby an article having improved dimensional stability is obtained.

The process of this invention essentially comprises heating a copolymer of ethylene and a vinyltrialkoxysilane, as hereinafter defined, at a temperature of from about 130° C., or lower, to about 350° C., or higher, with temperatures of from about 180° C. to 300° C. preferred.

The ethylene/vinyltrialkoxysilane copolymers that can be cross-linked according to the process of this invention contain from about 5 weight percent to about 99 weight percent polymerized ethylene and from about 95 weight percent to about 1 weight percent of a polymerized vinyltrialkoxysilane, with copolymers having from about 50 to about 99 weight percent polymerized ethylene and from about 50 to 1 weight percent polymerized vinyltrialkoxysilane preferred. Such copolymers can have melt indices of from about 0 to about 3000 or more decigrams per minute, as determined according to ASTM D–1238–57T, with copolymers having melt indices of from 2 to 1000 decigrams per minute preferred.

The vinyltrialkoxysilanes which are copolymerized with ethylene to produce the cross-linkable copolymers are represented by the formula:

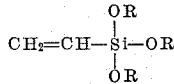

wherein each R is an alkyl radical having from about 1 to about 5 or more carbon atoms, such as methyl, ethyl, propyl, isopropyl, butyl, tert-butyl, pentyl, and the like. As examples of vinyltrialkoxysilanes which can be copolymerized with ethylene to produce the cross-linkable copolymers useful in the process of this invention, one can mention vinyltrimethoxysilane, vinyltriethoxysilane, vinyltripropoxysilane, vinyltriisopropoxysilane, vinyltributoxysilane, vinyltripentoxysilane, and the like.

The cross-linkable ethylene/vinyltrialkoxysilane copolymers are produced by copolymerizing ethylene and a vinyltrialkoxysilane, as defined above, in contact with a free-radical catalyst at high pressures; employing batch, semi-continuous, or continuous processes in conventional polymerization equipment, such as stirred autoclaves, tubular reactors, and the like, according to procedures known to one skilled in the art.

The amount of vinyltrialkoxysilane in the charge can vary from about 0.1 to about 30 weight percent or more, based upon total comonomer weight, and the amount of ethylene in the charge can vary from about 99.9 weight percent to about 70 weight percent or less, based upon total comonomer weight.

By a "free-radical catalyst" is meant a compound which is capable of producing free radicals under the polymerization conditions employed, such as compounds having an —O—O— or an —N=N— linkage. As examples of free radical type catalysts one can mention oxygen; hydrogen peroxide; alkyl peroxides, such as tert-butyl hydroperoxide, di-tert-butyl peroxide, and the like; acyl and aroyl peroxides, such as dibenzoyl peroxide, perbenzoic acid, dilauroyl peroxide, perlauric acid, acetyl benzoyl peroxide, and the like; azo compounds, such as azo-bis-isobutyronitrile, dimethylazodiisobutyrate, azo - bis-1-phenylethane, alkali metal azodisulfonates, and the like; etc. In general, the free-radical catalysts are employed in an amount that is from about 0.001 weight percent to about 5 weight percent, based on the combined weight of the comonomers, with from 0.001 weight percent to about 0.05 weight percent preferred.

The copolymerization is conducted at a temperature that is at or above the activation temperature of the particular catalyst employed. For example, temperatures greater than about 25° C. are employed when isopropyl percarbonate is the catalyst, while temperaures of at least 70° C. are employed when dibenzoyl peroxide is the catalyst. In general, however, temperatures of from about 40° C., or lower, to about 350° C., or higher, are employed, with temperatures of from about 70° C. to about 250° C. preferred. Care must be taken at higher temperatures that the time of the copolymerization is not long enough to initiate substantial cross-linking. Thus, where batch processes are employed, the temperature for the copolymerization is preferably less than about 120° C. Where higher temperatures are employed, it is preferred to conduct the copolymerization continuously in a tubular reactor, employing residence times from about 0.1 minute to about 3 minutes. Pressures of from about 10,000 p.s.i.g. to about 100,000 p.s.i.g. are generally employed for the copolymerization, with pressures of from about 15,000 p.s.i.g. to about 45,000 p.s.i.g. preferred. The ethylene/vinyltrialkoxysilane copolymers produced according to such procedures are recovered by methods known to those skilled in the art.

The ethylene/vinyltrialkoxysilane copolymer, when produced as above, consists of chains containing

groups and groups of the formula:

wherein R is as previously defined. On heating of the copolymer cross-linking occurs between the pendant trialkoxysilane groups. It should be noted that the temperature range over which the ethylene/vinyltrialkoxysilane copolymers are cross-linked overlaps the temperature range at which the initial copolymerization can be conducted. Thus, the product of the initial copolymerization may be cross-linked to some degree. Nevertheless, even if the copolymer, as initially produced, is cross-linked, the process of this invention can be employed to modify the physical properties of the copolymer, such as softening point, dimensional stability, and the like, by further cross-linking. The process of this invention is most advantageous, however, where the copolymer to be cross-linked is substantially linear. By the term "substantially linear" is meant a copolymer which, when a 5 gram sample is heated in 100 cc. of a refluxing solvent, such as xylene, for about 30 minutes, the sample is completely dissolved. If the ethyl/vinyltrialkoxysilane is cross-linked to any substantial degree the copolymers will not dissolve at these conditions.

The ethylene/vinyltrialkoxysilane copolymers can be cross-linked according to the process of this invention either alone or in admixture with up to about 75 percent or more of the well known inorganic fillers, such as titanium dioxide, calcium carbonate, silica gel, carbon black, clay, and the like, or with other polymeric materials, such as polyethylene. Such fillers can be incorporated with the ethylene/vinyltrialkoxysilan copolymer by methods known to those skilled in the art, such as by milling and the like, and the resulting admixture then subjected to the heat curing process of this invention.

The following examples are illustrative. The physical properties of the polymers disclosed therein were measured according to the following tests:

(1) Melt index was determined at 190° C. according to ASTM D-1238-57T.

(2) Tensile strength and percent elongation were determined according to ASTM D-882-56T.

(3) Stiffness was determined by employing the procedure of ASTM D-638-60T. and multiplying by 100 the quotient of the stress in p.s.i. divided by 1% of the strain.

EXAMPLE I

A 1480 ml. high-pressure, stirrer-equipped autoclave was charged with 50 grams of vinyltriethoxysilane, 500 grams of benzene, and 1 gram of dibenzoyl peroxide. The autoclave was then sealed and purged of air by pressuring the autoclave to 50 p.s.i.g. with oxygen-free ethylene and venting to atmospheric pressure, after which the autoclave was pressurized to 5000 p.s.i.g. with oxygen-free ethylene. The reaction mixture was then heated to 90° C. and additional ethylene was added until a pressure of 15,000 p.s.i.g. was reached, corresponding to about 426 grams of ethylene in the autoclave (89.5 weight percent ethylene, based upon total comonomer weight). The reaction mixture was heated at 90° C. and at a pressure of 15,000 p.s.i.g., with stirring, for 2 hours, after which time the reaction mixture was cooled and excess ethylene was vented to the air. The resulting ethylene/vinyltriethoxysilane copolymer was removed from the autoclave and washed three times with 500 ml. portions of methanol, the copolymer being filtered from the methanol after each washing. The ethylene/vinyltriethoxysilane copolymer, after air drying at 55° C., weighed 46 grams. Carbon-hydrogen analysis of the ethylene/vinyltriethoxysilane copolymer indicated that there was 30.6 weight percent copolymerized vinyltriethoxysilane in the copolymer. The specific viscosity of the copolymer was 0.23 as determined from a solution of 0.4 gram of the copolymer in 100 ml. of ethylcyclohexane at 30° C. The ethylene/vinyltriethoxysilane copolymer was molded into plaques measuring 3 inches in diameter and 0.020 inch thick at a pressures of 850 p.s.i. and a temperature of 120° C.

The physical properties of the copolymer, as measured from test samples measuring 1 inch x 0.25 inch x 0.020 inch cut from these plaques, are as follows:

Melt index, dg./min. _____ 403
Tensile strength, p.s.i. _____ 522
Percent elongation _____ 225
Stiffness, p.s.i. _____ 3,371

EXAMPLE II

A mixture containing 87.0 weight percent ethylene and 13.0 weight percent vinyltriethoxysilane, together with 6.0 weight percent toluene, based on total charge weight, and 0.056 weight percent benzoyl peroxide, based on total charge weight, was fed to a tubular reactor for a period of ½ hour at a reactor temperature of 135° C. and a reactor pressure of 35,000 p.s.i.g. The ethylene/vinyltriethoxysilane copolymer recovered weighed 196 grams. Silicon analysis of the copolymer indicated there was 14.2 weight percent polymerized vinyltriethoxysilane in the copolymer. The physical properties of the ethylene/vinyltriethoxysilane copolymer are as follows:

Melt index, dg./min. _____ 112
Tensile strength, p.s.i. _____ 777
Percent elongation _____ 188
Stiffness, p.s.i. _____ 7,528

EXAMPLE III

Plaques of the copolymers produced according to Examples I and II were heated at 220° C. and a pressure of 850 p.s.i. for times of up to 1 hour. The physical properties of the cured copolymers are set forth in Table A, below, together with the properties of the uncured copolymers for purposes of comparison.

Table A

CURED ETHYLENE/VINYLTRIETHOXYSILANE COPOLYMERS

| Weight percent of vinyltriethoxysilane | Cure time, min. | Melt index, dg./min. | Tensile strength p.s.i. | Percent elongation | Stiffness, p.s.i. |
|---|---|---|---|---|---|
| 14.2 [1] | 0 | 112 | 777 | 188 | 9,528 |
| | 15 | 0.013 | 1,330 | 545 | 10,359 |
| | 30 | 0.000 | 1,544 | 760 | 11,162 |
| | 60 | 0.000 | 1,413 | 710 | 10,123 |
| 30.6 [2] | 0 | 403 | 522 | 225 | 3,371 |
| | 15 | 0.04 | 1,122 | 255 | 4,067 |
| | 60 | 0.000 | 1,011 | 610 | 4,073 |

[1] Copolymer of Example II.
[2] Copolymer of Example I.

EXAMPLE IV

The ethylene/vinyltriethoxysilane copolymer produced according to Example II was mixed with titanium dioxide, calcium carbonate, silica gel, and two grades of carbon black ( (a) 472 millimicron particle size and (b) 42 millimicron particle size) on a two-roll mill at a temperature of about 100° C. The resulting filled copolymer compositions were then formed into plaques measuring 3 inches in diameter and 0.020 inch thick at 120° C. and 850 p.s.i. and then cured at 220° C. for 1 hour. The physical properties of the cured filled copolymer compositions, together with the physical properties of the cured unfilled copolymer, are set forth in Table B:

Table B

EFFECT OF FILLERS ON ETHYLENE/VINYLTRIETHOXYSILANE COPOLYMER

| Filler | Parts filler per 100 parts copolymer | Tensile strength, p.s.i. | Percent elongation | Stiffness, p.s.i. |
|---|---|---|---|---|
| None | 0 | 1,413 | 710 | 10,123 |
| Titanium dioxide | 50 | 1,487 | 560 | 13,341 |
| Calcium carbonate | 50 | 1,026 | 260 | 14,357 |
| Silica gel | 50 | 1,461 | 40 | 26,654 |
| Carbon black: | | | | |
| (a) | 50 | 1,124 | 240 | 20,476 |
| | 75 | 1,134 | 90 | 28,656 |
| | 100 | 1,244 | 95 | 30,480 |
| | 125 | 1,336 | 58 | 36,680 |
| (b) | 50 | 1,737 | 165 | 22,570 |
| | 100 | 1,620 | 10 | 51,446 |
| | 125 | 3,080 | 10 | 61,240 |

From Table B it can be seen that the physical properties of cross-linked ethylene/vinyltriethoxysilane copolymers are varied by the presence of various fillers and can be further modified by the type, amount, and particle size of the filler employed.

What is claimed is:

1. The process for cross-linking a substantially linear copolymer consisting essentially of from 5 to 99 weight percent polymerized ethylene and from 95 to 1 weight percent of a polymerized vinyltrialkoxysilane represented in the monomeric form by the formula:

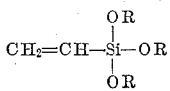

wherein each R is an alkyl radical having from 1 to 5 carbon atoms, which comprises heating said copolymer at a temperature of from 130° C. to 350° C.

2. The process for cross-linking a substantially linear copolymer consisting essentially of from 50 to 99 weight percent polymerized ethylene and from 50 to 1 weight percent of a polymerized vinyltrialkoxysilane represented in the monomeric form by the formula:

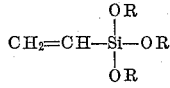

wherein each R is an alkyl radical having from 1 to 5 carbon atoms, which comprises heating said copolymer at a temperature of from 180° C. to 300° C.

3. The process as claimed in claim 2 wherein said vinyltrialkoxysilane is vinyltriethoxysilane.

References Cited by the Examiner

UNITED STATES PATENTS

| | | | |
|---|---|---|---|
| 2,391,218 | 12/1945 | Bacon et al. | 260—2 |
| 2,448,391 | 8/1948 | Pyle | 260—46.5 |
| 2,532,583 | 12/1950 | Tyran | 260—46.5 |
| 2,716,128 | 8/1955 | West | 260—448.2 |
| 2,742,378 | 4/1956 | TeGrotenhuis | 260—46.5 |
| 2,777,868 | 1/1957 | Mixer et al. | 260—46.5 |
| 2,777,869 | 1/1957 | Bailey et al. | 260—46.5 |
| 2,894,922 | 7/1959 | Olson et al. | 260—46.5 |
| 2,962,489 | 11/1960 | Zeldin | 260—94.9 |
| 3,013,915 | 12/1961 | Morgan | 260—46.5 |

OTHER REFERENCES

Thompson: "Copolymerizations of Vinyl Silanes," Journal of Polymer Science, XIX, 373–377 (1956).

LEON J. BERCOVITZ, *Primary Examiner.*

J. R. LIBERMAN, WILLIAM H. SHORT, *Examiners.*